US009530244B2

(12) United States Patent
    Acree

(10) Patent No.: US 9,530,244 B2
(45) Date of Patent: Dec. 27, 2016

(54) METHOD AND APPARATUS FOR SHADOW ESTIMATION AND SPREADING

(71) Applicant: Intergraph Corporation, Madison, AL (US)

(72) Inventor: Elaine S. Acree, Madison, AL (US)

(73) Assignee: Intergraph Corporation, Madison, AL (US)

( * ) Notice: Subject to any disclaimer, the term of this patent is extended or adjusted under 35 U.S.C. 154(b) by 115 days.

(21) Appl. No.: 14/538,276

(22) Filed: Nov. 11, 2014

(65) Prior Publication Data

US 2016/0133048 A1    May 12, 2016

(51) Int. Cl.
    *G06T 17/05*    (2011.01)
    *G06T 15/60*    (2006.01)
    *G01C 21/00*    (2006.01)
    *G06T 7/00*     (2006.01)

(52) U.S. Cl.
    CPC .............. *G06T 15/60* (2013.01); *G01C 21/00* (2013.01); *G06T 7/0053* (2013.01); *G06T 17/05* (2013.01); *G06T 2215/12* (2013.01)

(58) Field of Classification Search
    CPC ...................................... G06T 15/60
    See application file for complete search history.

(56) References Cited

U.S. PATENT DOCUMENTS 6,664,962 B1 * 12/2003 Komsthoeft ............ G06T 15/60
                                                        345/421
8,291,345 B2   10/2012 Howard ..................... 715/848

2003/0023412 A1 *  1/2003 Rappaport ............ H04W 16/20
                                                         703/1
2010/0283853 A1 * 11/2010 Acree ..................... G01C 11/00
                                                        348/144
2010/0295851 A1 * 11/2010 Diamond .............. G06T 15/405
                                                        345/422

(Continued)

FOREIGN PATENT DOCUMENTS

EP         2 234 069 A1    9/2010    ............ G06T 15/60

OTHER PUBLICATIONS

Williams, "Casting Curved Shadows on Curved Surfaces," *SIGGRAPH '78 Proc. 5th Annual Conf. on Computer Graphics*, pp. 270-274 (1978).

(Continued)

*Primary Examiner* — Joni Richer
*Assistant Examiner* — Grace Q Li
(74) *Attorney, Agent, or Firm* — Sunstein Kann Murphy & Timbers LLP

(57) ABSTRACT

A computer-implemented method for creating an image that depicts shadowing for a specified light source even though the input data is not three-dimensional and is limited to elevation data that associates an elevation value with each of a plurality of spatial coordinates. Plumb line walls are generated between elevation points of neighboring grid cells for each elevation point meeting a specified delta elevation criterion. A shadow map is accumulated based on visibility of each pixel to the light source position, and then, in a subsequent pass through the coordinate pixels of the data, an image is created in a tangible medium with each pixel correspondingly visible or shadowed, either totally or partially. Values along one dimension may be spread over a Z-buffer range to optimally resolve visibility features.

14 Claims, 6 Drawing Sheets

(56) References Cited

U.S. PATENT DOCUMENTS

2012/0035887 A1* 2/2012 Augenbraun .......... G06T 15/06
  703/1

OTHER PUBLICATIONS

Giles, "Remote Sensing and Cast Shadows in Mountainous Terrain," *Photogrammetric Engineering & Remote Sensing,* vol. 67, No. 1, pp. 833-839 (Jul. 2001).
Kang et al., "Acceleration of Terrain Rendering Using Cube Mesh," *Virtual Reality,* Lecture Notes in Computer Science, Springer, pp. 71-79 (Jul. 22, 2007).
Weinhaus et al., "Texture Mapping 3D Models of Real-World Scenes," *ACM Computing Surveys,* vol. 29, No. 4, pp. 325-365 (Dec. 1997).
"Shadow mapping," *Wikipedia, the free encyclopedia,* 7 pages [retrieved from the internet: URL:https//en.wikipedia.org/w/index.php?title=Shadow_mapping&oldid=632600511 on Nov. 19, 2015].
Christophe Tillier, Authorized officer European Patent Office, International Search Report—Application No. PCT/US2015/046303, mailed Jan. 27, 2016 (12 pages), together with the Written Opinion of the International Searching Authority.

* cited by examiner

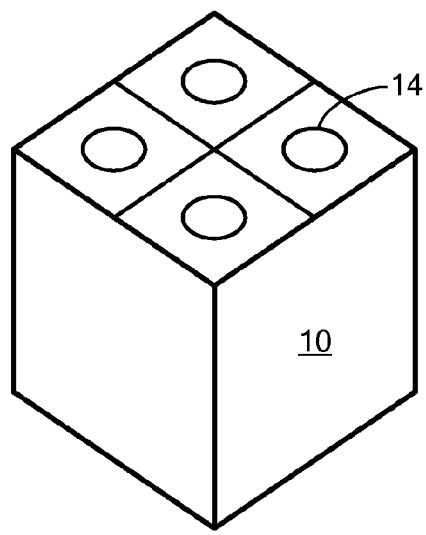
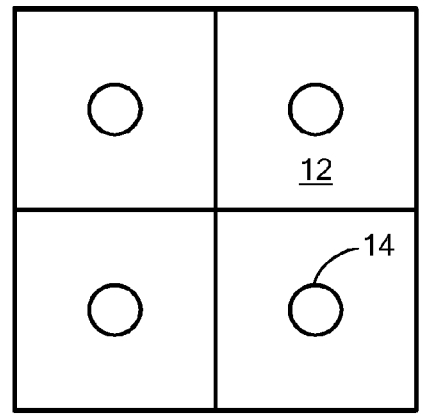
FIG. 1A
PRIOR ART
FIG. 1B
PRIOR ART
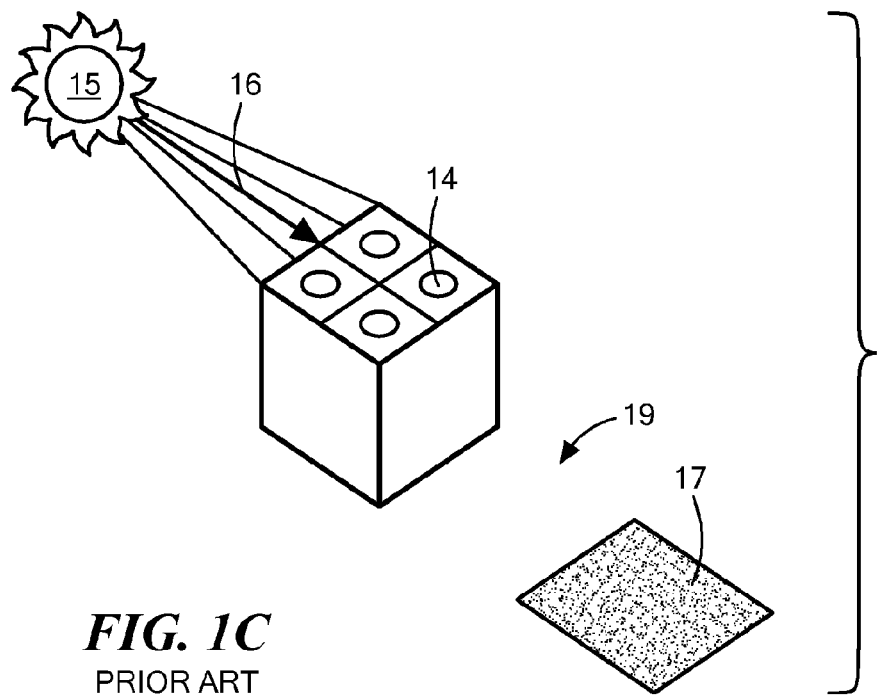
FIG. 1C
PRIOR ART

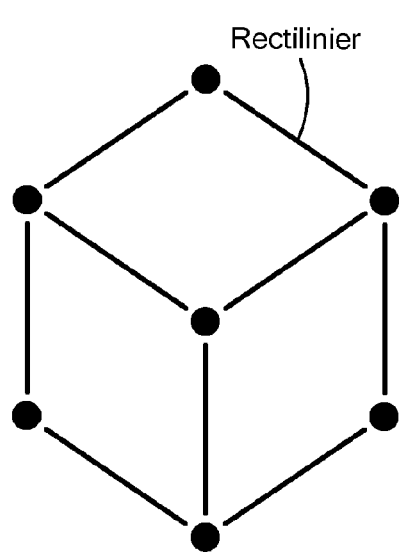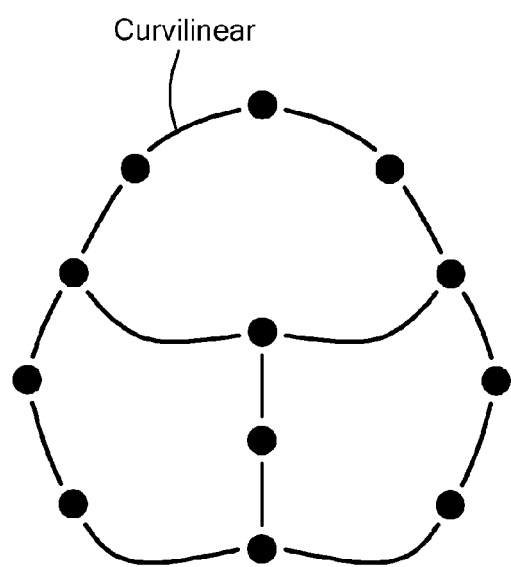
*FIG. 5A*  *FIG. 5B*

METHOD AND APPARATUS FOR SHADOW ESTIMATION AND SPREADING

TECHNICAL FIELD

The present invention relates to the generation of shadows in images, and, more particularly, to methods and apparatus for performing shadowing on the basis of very large 2.5-dimensional elevation data sets.

BACKGROUND ART

Shadow mapping is a technique, generally traced back to the paper of Williams, "*Casting curved shadows on curved surfaces,*" *SIGGRAPH '78 Proc. 5th Annual Conf. on Computer Graphics*, pp. 270-74 (1978) (incorporated herein by reference), used to determine where shadows lie in 3D computer graphics on the basis of knowledge of the source and direction of light illuminating a 3D scene. In traditional shadow mapping, each pixel is tested as to whether it is visible from the light source and thus illuminated by it, and, if not, the pixel is designated as to be shadowed.

As described, shadow mapping is based upon 3D data. However, in the context of geographic information systems (GIS), 3D data may not be available. Indeed, it would be highly desirable to provide the capability to estimate shadows cast by any illumination source, either indoors or outdoors, where the available data might be surface elevation, LIDAR, point cloud, or partial surface data, and where full side wall data may not be available. In particular, data relevant to side walls of man-made structures, or to naturally occurring slopes in hilly or mountainous terrain, are largely absent from elevation data.

For purposes of illustration, FIG. 1A shows a three-dimensional object, namely cube 10, and how that cube might be represented in 2.5D elevation data. A top view of cube 10, shown in FIG. 1B, depicts four resolution cells 12, where each cell is characterized by an elevation point 14, and where the elevation points as a function of position—on the surface of the Earth, for example, comprise a set of elevation data. Elevation data, however, provide no information about sides of the three-dimensional object 10. The result of the absence of data regarding sides of object 10 is shown in FIG. 1C where light 16 from source 15 is shadowed by object 10, however the calculated shadow 17 cast by object 10 does not include the intervening region 19 where a calculated shadow is missing.

Moreover, in addition to the absence of full 3D geometric data, another daunting feature of GIS data sets is the very large quantity of data that must be processed, often in a near real-time mode.

SUMMARY OF EMBODIMENTS OF THE PRESENT INVENTION

In accordance with an embodiment of the present invention, a computer-implemented method is provided for creating an image in a tangible medium of a physical scene. The computer-implemented method has steps of:

receiving elevation point data in which an elevation value is associated with each of a plurality of spatial coordinates;
determining a light source position specified in 3D space;
transforming the elevation point data to a Cartesian coordinate system;
generating plumb line walls between elevation points of neighboring grid cells for each elevation point meeting a specified delta elevation criterion;
building a modelview matrix based on the specified light source position;
accumulating a shadow map based on visibility of each pixel to the light source position;
employing a projection matrix for transforming the shadow map to a viewer frame of reference;
and, in a subsequent pass through pixels within a specified view volume,
processing each pixel as a visible pixel or an occluded pixel on a basis of the shadow map; and
creating the image in the tangible medium with each pixel correspondingly visible or shadowed.

In accordance with alternate embodiments of the present invention, the elevation point data may be formatted in a grid of image tiles. The elevation point data may be provided in geographic coordinates.

In other embodiments of the invention, the method may have a further step of calculating solar insolation on the basis of the shadow map. The shadow map, like the input data, may be formatted in a grid of image tiles.

In further embodiments, determination of the light position may be based on a specified geographic location and a specified time. Accumulating the shadow map may include testing points in a Z buffer, as well as calculation in a raster coordinate system, and may be based in part on material properties of illuminated surfaces. Accumulating the shadow map may include tracing rays of illumination, and may additionally account for ambient light.

In accordance with another aspect of the present invention, a computer program product is provided for use on a computer system for creating an image in a tangible medium of a physical scene, wherein the image includes multiple pixels. The computer program product includes a non-transitory computer-readable medium on which are stored computer instructions such that, when executed by a processor, the instructions cause the processor to:

receive elevation point data in which an elevation value is associated with each of a plurality of spatial coordinates;
determine a light source position specified in 3D space;
transform the elevation point data to a Cartesian coordinate system;
generate plumb line walls between adjacent grid cell points for each elevation point meeting a specified delta elevation criterion;
build a modelview matrix based on the specified light source position;
accumulate a shadow map based on visibility of each pixel to the light source position;
transform the shadow map to a viewer frame of reference; and, in a subsequent pass through pixels within a specified view volume,
process each pixel as a visible pixel or an occluded pixel on a basis of the shadow map; and
create the image in the tangible medium with each pixel correspondingly visible or shadowed.

In other embodiment of the invention, the computer program product may have instructions that cause the processor to format the shadow map in a grid of image tiles. The instructions may also cause the processor to optimize a Z depth spread of a raster coordinate system.

BRIEF DESCRIPTION OF THE DRAWINGS

The invention will be more fully understood by referring to the following Detailed Description of Specific Embodiments in conjunction with the Drawings, of which:

FIGS. 1A-1C show schematic representations of an object and its representation in elevation data. FIGS. 1A and 1C show perspective views of the object, while FIG. 1B shows a top view. FIG. 1C illustrates how the absence of data with respect to the sides of the object preclude comprehensive shadowing in the prior art.

FIGS. 5A and 5B show schematic representations of bounding volumes based on rectilinear and curvilinear data coordinates, respectively.

DETAILED DESCRIPTION OF SPECIFIC EMBODIMENTS

Definitions

Figure 2:
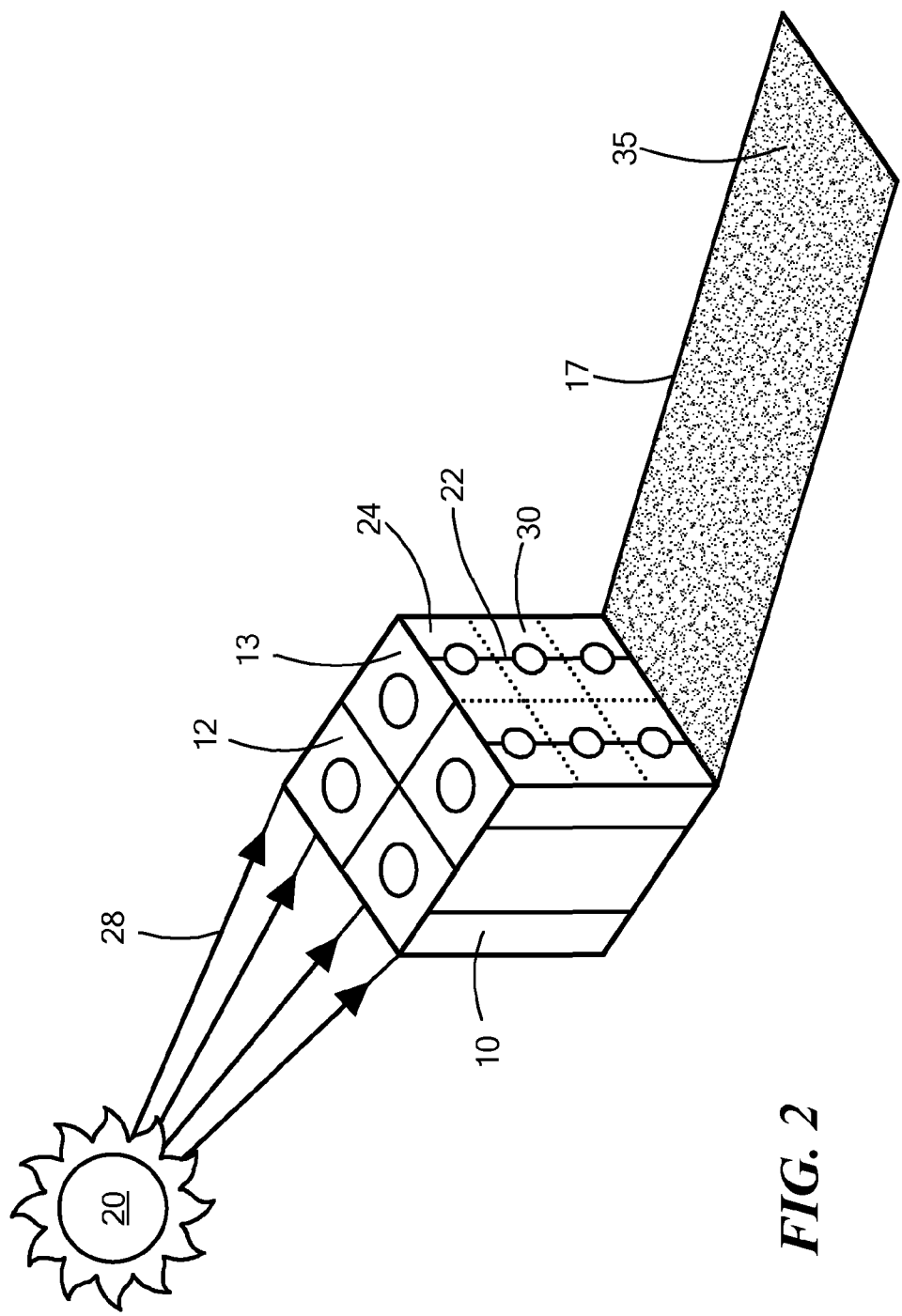
FIG. 2 is a schematic representation of shadow estimation with 2.5D data in accordance with an embodiment of the present invention.

The term "image" shall refer to any multidimensional representation, whether in tangible or otherwise perceptible form, or otherwise, wherein a value of some characteristic (amplitude, phase, etc.) is associated with each of a plurality of locations (or, vectors in a Euclidean space, typically $\mathbb{R}^2$) corresponding to dimensional coordinates of an object in physical space, though not necessarily mapped one-to-one thereonto. Thus, for example, the graphic display of the spatial distribution of some field, either scalar or vectorial, such as brightness or color, or intensity of a generated second harmonic, constitutes an image. So, also, does an array of numbers, such as a 3D holographic dataset, in a computer memory or holographic medium. Similarly, "imaging" refers to the rendering of a stated physical characteristic in terms of one or more images.

The term "shadow map," used here synonymously with the term "occlusion map," refers to an image in which pixels are tagged as visible, or not, as viewed from a locus in space denoted as the "viewer's position."

The term "point of illumination" may refer either to a point, in a rigorous geometrical sense, or to a "patch," in that it refers to an area, defined in three-dimensional space, that is compact, in a rigorous mathematical sense, from which light is assumed to emanate—typically, but not necessarily, in parallel rays—such as to illuminate a scene.

A "distant light source direction" refers to a direction from which light emanating from a source of illumination may be assumed to propagate with a planar phase front, i.e., with all rays traveling in parallel toward the illuminated scene.

A "modelview matrix" shall refer to a transformation from object coordinates to coordinates in a frame of reference based on a position and direction specified in 3D space, such as a point of illumination or a point of view.

A "projection matrix" shall refer to a transformation from object coordinates to coordinates in a subspace, which is to say, a space of lower dimensionality, such as a two-dimensional image of a three-dimensional scene.

The term "time" is used herein in the most general sense possible, and includes date and astronomical epoch, or whatever other parameters are used to indicate time in a desired frame of reference.

The term "elevation data," or, equivalently, "2.5D data," are data that provide elevations corresponding to specific point, or coordinates, on a surface, such as the surface of the Earth, for example. Elevation data may be collected in any number of manners, including remote sensing methods such as LIDAR, or other aerial survey methods, or by terrestrial surveys, again, by way of example only.

In accordance with embodiments of the present invention, two sorts of inputs are used to create a shadow map: elevation data sets, in any of a large variety of possible formats, and immediate-user-defined inputs. The immediate-user-defined inputs may include such parameters as the date and time (allowing for calculation of the position of the Sun, criteria defining an elevation-change delta (as discussed below) for generating a plumb line, and the spacing density of inferred points on generated plumb lines. These are examples of immediate-user-defined inputs, provided here as examples, and without limitation.

Many methods for creating shadow maps may be practiced in accordance with the prior art. The present invention pertains to various novel methods that are now described and claimed herein. Referring, first, to FIG. 2, conceptual principles of certain embodiments of the present invention are discussed. Elevation data define elevation characteristics of terrestrial, or other, features, symbolized in FIG. 2 by cube 10, having elevation points 14 associated with respective resolution cells 12, as in FIG. 1A-1B. In accordance with embodiments of the present invention, plumb lines 22 are imputed to the feature symbolized by cube 10, defining a surface 24 that allowing subsequent shadowing calculations to assume either complete shadowing by surface 24 of illumination cast by source 20, or else specified optical qualities, such as attenuation or scattering. Rays 28 denote effective propagation vectors of light emanating from source 20 incident on a feature at a defined position in space. Source 20, as illustrated, is a "near" source, while, for "distant" source such as the Sun relative to a terrestrial feature, rays 28 may be taken as effectively parallel.

As an overview, a method of shadow estimation, designated generally by numeral 100, is now described with reference to FIG. 3. It is to be understood that, within the scope of the present invention, steps in accordance with the method need not be performed in the sequence in which they are shown, described, or claimed. In a step that is first—as a matter of enumeration, although not necessarily temporally first, elevation data is received as input (102) to the method 100 of shadow estimation. Elevation data may be supplied in any of a number of formats, or in a combination of such formats. The data may have been acquired by remote sensing, such as satellite remote sensing, for example, however embodiments of the present invention may be applied to elevation data acquired by any means.

The elevation data that are input in step 102 may be supplied in any format. For example, the elevation data may be formatted into a regular grid of image tiles, which may be provided in one or more separate data files. While elevation data may be supplied in any of a variety of coordinate systems, the data are then transformed to Cartesian coordinates (104) using standard coordinate transformation techniques. Within the scope of the present invention, transformation to Cartesian coordinates may be performed in one or more steps. For example, the elevation data may first be converted to latitude/longitude format, and then to Cartesian coordinates.

Input data may also include the time and date for which shadow casting data are desired. Within the scope of the present invention, the time may be provided in whatever time frame is desired. For example, a terrestrial time zone may be specified, or else a time zone may be extracted based on the geographic location of the input data. If the data pertain to another planet, for example, the time may be designated using any convention for specification of time.

Typically, the data will be handled as gridded into a raster array, with a point of elevation data centered within each grid cell. It is to be understood, however, that implementation of embodiments of the present invention does not rest on any particular gridding of the data. Once the data points have been recast in raster space, the values of vectors in raster representation (RasterX, rasterY, rasterZ) will typically assume values within the following ranges: RasterX: [0, Full Virtual Raster Width]; RasterY: [0, Full Virtual Raster Width]; and RasterZ: [0,1]. Optimal spreading of Z values over the Z raster range is an optional aspect of the present invention, and will be discussed in detail below.

The light source position is then determined (106) relative to the scene to be shadow-mapped. Any method for specifying the light source position is within the scope of the present invention. One example is that of determining the position of the Sun relative to a terrestrial scene in order to compute insolation based on a time specified by the user. Determining the position of the Sun (or any other astronomical source) relative to a specified position on Earth at a specified time is an astronomical procedure well-known to persons of ordinary skill in astronomy and needs no further description here. In various shadow mapping applications, however, the Sun may be treated as a distant light source, which is to say that the illumination phase front is flat, i.e., that light rays 28 (shown in FIG. 2) emanating from the source are effectively parallel. Thus, within embodiments of the present invention, a smaller distance to the Sun than the actual distance may be employed, with the pseudo position of the Sun along a light direction vector represented by ray 28.

In accordance with embodiments of the present invention, a shadow map is generated during two passes through the elevation points in the input data. During the first pass through the data, plumb lines are generated from upper to adjacent lower elevations (108) on the basis of criteria that may be determined by the immediate user. Typically, the immediate user will specify an elevation change delta, defined such that if elevation points in adjacent cells 12 and 13 (shown in FIG. 2) exceed the specified elevation change delta, a plumb line 22 will be dropped to constitute a surface or plumb line wall (also, "wall") 30 (when filled out to encompass one of more cell faces). Plumb line 22 and wall 30 may be referred to herein as an "inferred", in that neither is present in the original 2.5D data from which they are derived.

At this juncture, the Z buffer depth range may be spread (110), as further described in detail below. Adjusting the effective position of light source 20 allows the visibility test, performed in conjunction with accumulation of a shadow map, to be performed more accurately, by computing as large a spread between non-adjacent points as is viable. In essence, the computed rasterZ values are spread over the entire closed [0,1] rasterZ range.

One or more data transformation matrices, including a modelview transformation, are calculated (112) based on the light source position, so that shadowcasting tests may be performed, in accordance with any of the 3D shadow casting algorithms that are known in the art. A shadow visibility map (otherwise referred to herein as an "occlusion map" or "shadow occlusion map") is the accumulated using standard techniques, or otherwise, for determining whether a given pixel is exposed to source 20, or whether an inferred wall 30 intervenes such that a given pixel 35 is obscured, as shown in FIG. 2, by the inferred wall. It is to be understood that, within the scope of the present invention, a given pixel 35 may be shaded in full or only partially, if an attenuation that is less than total is attributed to inferred wall 30. As used herein, the term "occluded" shall encompass the case where a pixel is partially shaded.

Figure 4:
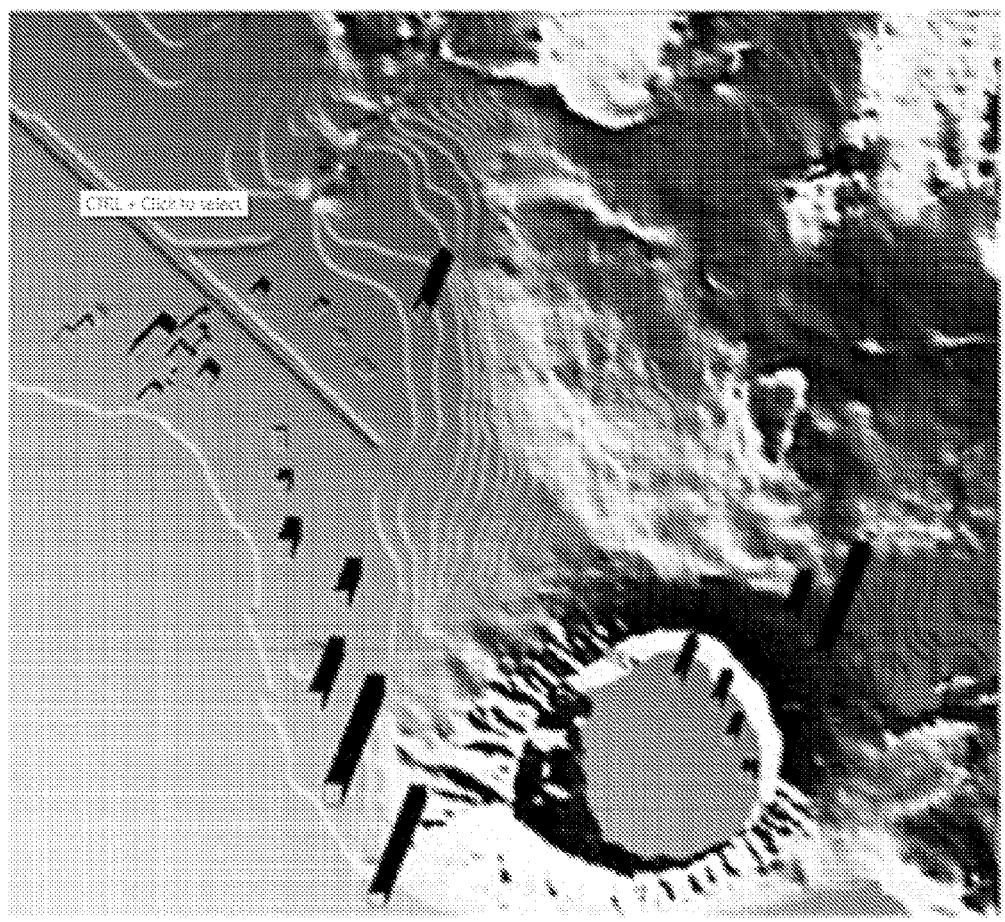
FIG. 4 is an image generated from 2.5D elevation data showing shadows cast in accordance with an embodiment of the present invention.

Once all relevant pixels have been tagged as visible or occluded, a second pass through the data is performed. A projection transformation is applied (116) accounting for the viewing point with respect to the scene that is being mapped. Then, on the basis of the pixel markings as to occlusion, with the pixels suitably transformed to the frame of the viewer, a shadow image is created (118), coloring points based on their visibility for line-of-sight or viewshed analysis, for example, using any of the shadow image creation techniques known in the art. More than a single source 15 of illumination may be considered, within the scope of the present invention, as may ambient lighting. Alternatively, the occlusion data may be applied, within the scope of the present invention, for other computational purposes, such as the computation of solar insolation, for example. FIG. 4 illustrates typical results obtained where structures have been placed on 2.5D data of the Diamond Head area of Honolulu, Hi., for purposes of demonstration.

Figure 3:
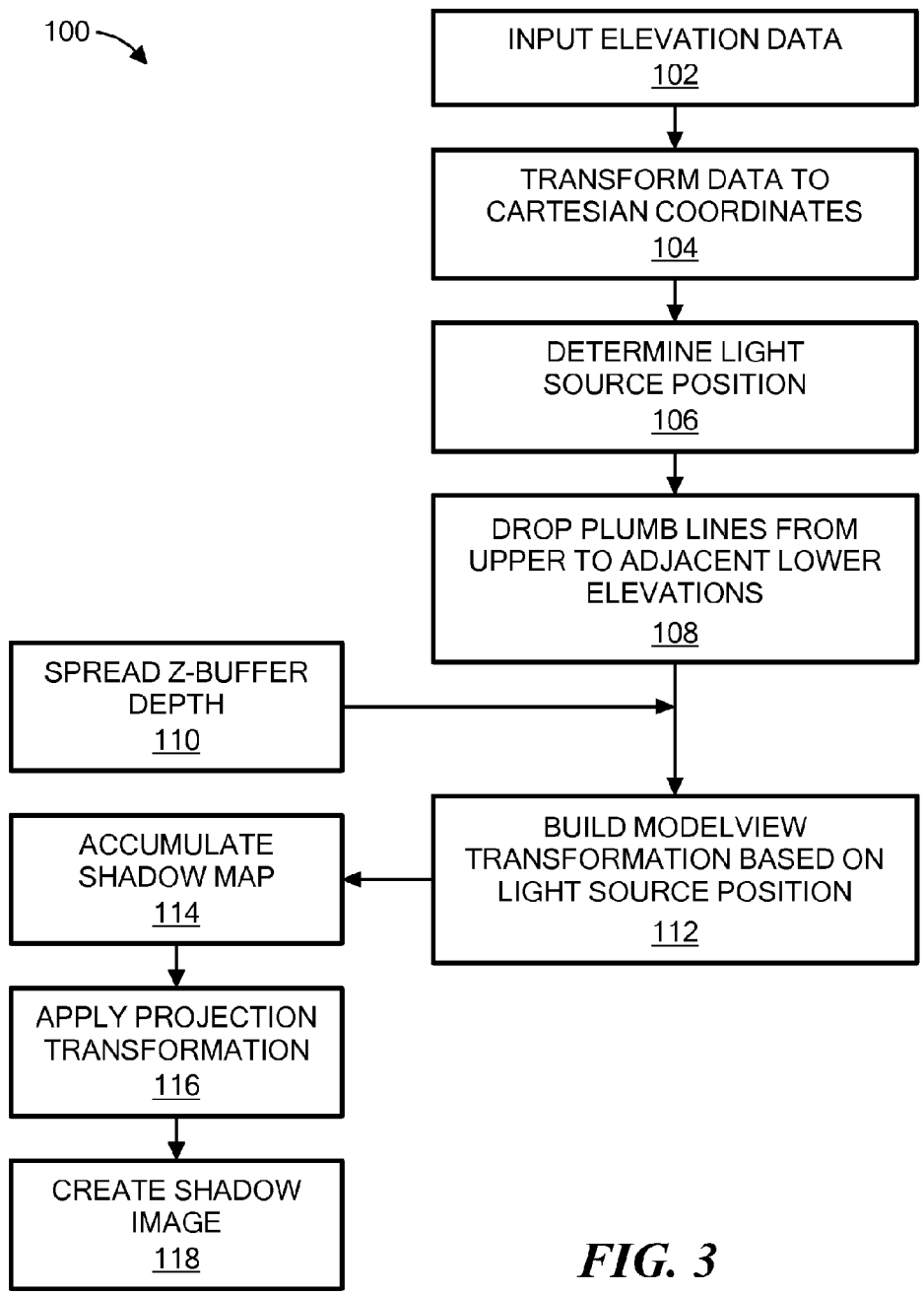
FIG. 3 is a flowchart depicting steps in the creation of a shadow map image in accordance with an embodiment of the present invention.

Further detail is now provided with respect to various embodiments of the method 100 of shadow estimation depicted schematically in the flowchart of FIG. 3. First, it should be noted that the large sets of elevation data are often tiled, and should be handled accordingly. Advantage may be taken of the tiled data and the tiled structure may be maintained. In the case where the input data are untiled, it is to be understood that, within the scope of the invention, the data may be handled as such, or else the input data (and, then, at the end of the first pass through the data, the output shadow map data) may be tiled prior to, or in the course of, processing.

As a preliminary step, it is preferred to compute a list of model volume boundary points based on the range of data in the initial model, as now described with reference to FIGS. 5A and 5B, so as to compute a proper boundary range volume. FIG. 5A shows a volume boundary based on an initial model presented in rectilinear coordinates. In the case, as depicted in FIG. 5B, where initial data are presented in geographic Earth coordinates, for example, or another set of curvilinear coordinates, the data are transformed to a Cartesian coordinate system, and extremal boundary values are determined. Boundary data values may be interpolated between extremal corner points, at regular intervals or otherwise, within the scope of the invention, as well. The minimum and maximum values of the complete set of boundary data values defines the bounding volume of the data, and avoids the production of intermediate matrices, as a result of intervening transformations, that would cause data to be clipped.

Once plumb lines 22 have been dropped and walls 30 inferred so as to create effective 3D data for shadowing, as herein taught for the first time, standard 3D graphics transformations may then be applied and a shadow map may be accumulated. The shadow or occlusion map is based on the 3D graphics concept of a Z buffer or depth map. In this transformation multiple points may transform to the same raster coordinate. At the end of a pass through the data, only one of the potentially multiple pixels will be visible. The visible pixel is the one that transforms to a Z depth or value closest to the viewpoint. The Z depth closest to the viewpoint will be the smallest Z value computed for the corresponding x, y raster coordinates.

A poor utilization of the Z range leads to poor shadow visibility test results, as it may be very difficult to tell which raster point is visible or in shadow and which point is not. With a proper spread of the raster Z values, two Z raster values lying within a small distance of each other may be considered both visible. But, when the majority of the Z values are clumped within a very small range, it is difficult to determine which points are visible and which are not even when a tolerance is used.

Figure 6:
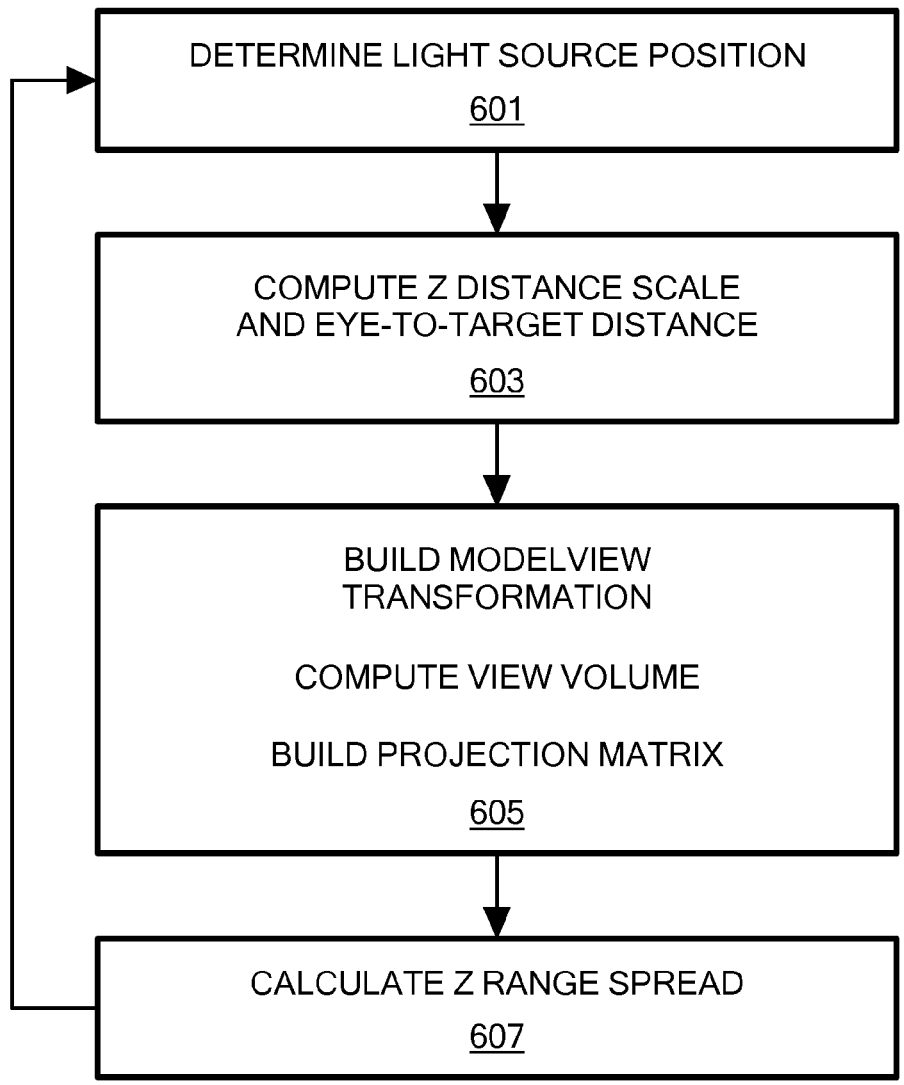
FIG. 6 is a flowchart depicting steps in the definition of a Z spread that optimizes visibility and occlusion resolution in accordance with an embodiment of the present invention.

In accordance with the present invention, Z values are spread in an iterative binary search for the best limits and best scale factor that may be obtained in a specified number of iterations. Any search algorithm may be employed to optimize the Z spread, within the scope of the present invention. A preferred method for optimizing the Z spread is now described, with reference to FIG. 6.

In a SetupModelParameters module, the raster data transformation matrices are initially set up. The light source position is determined (601) using the user specified date and time, for example, and the central model position of the input data. This computation establishes the distant light source direction to create the raster transformation matrices for the algorithm. For geographic data, for example, the central model position is calculated as the center surface point of the input 2.5D data.

In a ComputeZDistanceScaleFactor module (603), a Z distance scale is computed and a resulting eye-to-target distance. This allows for computation of the raster transformation matrices used in the visibility algorithm. In particular the Modelview Matrix and Projection Matrix are built, and the view volume is calculated (605) and tested for whether it is contained within, and optimally fills, the [0,1] range. The process may then be iterated to specified limits.

The above described methods may be performed, and the above described systems may be implemented, by a computer system, including a processor, by executing appropriate instructions stored in a memory. Apparatus for creating a shadow map of structures and terrain have been described as including a processor controlled by instructions stored in a memory. The memory may be random access memory (RAM), read-only memory (ROM), flash memory or any other memory, or combination thereof, suitable for storing control software or other instructions and data. Some of the functions performed by the transformation methods and apparatus have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on tangible non-transitory non-writable storage media (e.g. read-only memory devices within a computer, such as ROM, or devices readable by a computer I/O attachment, such as CD-ROM or DVD disks), information alterably stored on tangible non-transitory writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of the shadow estimation method have been described with reference to a flowchart, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiments.

What is claimed is:

1. A computer-implemented method for creating an image in a tangible medium of a physical scene, the image including a plurality of pixels, the method comprising:
   a. receiving elevation point data in which an elevation value is associated with each of a plurality of spatial coordinates corresponding to elevation points, each elevation point centered within a distinct grid cell;
   b. determining a light source position specified in 3D space;
   c. transforming the elevation point data to a Cartesian coordinate system;
   d. executing computer program instructions to generate plumb line walls between elevation points of neighboring distinct grid cells for each elevation point meeting a specified delta elevation criterion;
   e. building a modelview matrix, in a memory device within a computer, based on the specified light source position;
   f. accumulating a shadow map based on visibility of each pixel to the light source position;
   g. employing a projection matrix for transforming the shadow map to a viewer frame of reference;
   h. in a subsequent pass through pixels within a specified view volume, processing each pixel as a visible pixel or an occluded pixel on a basis of the shadow map; and
   i. creating the image in the tangible medium with each pixel correspondingly visible or shadowed.

2. A computer-implemented method according to claim 1, wherein the elevation point data are formatted in a grid of image tiles.

3. A computer-implemented method according to claim 1, wherein the elevation point data are provided in geographic coordinates.

4. A computer-implemented method according to claim 1, further comprising calculating solar insolation on the basis of the shadow map.

5. A computer-implemented method according to claim 1, wherein the shadow map is formatted in a grid of image tiles.

6. A computer-implemented method according to claim 1, wherein determining the light position is based on a specified geographic location and a specified time.

7. A computer-implemented method according to claim 1, wherein accumulating the shadow map includes testing points in a Z buffer.

8. A computer-implemented method according to claim 1, wherein accumulating the shadow map includes calculation in a raster coordinate system.

9. A computer-implemented method according to claim 1, wherein accumulating the shadow map is based in part on material properties of illuminated surfaces.

10. A computer-implemented method according to claim 1, wherein accumulating the shadow map includes tracing rays of illumination.

11. A computer-implemented method according to claim 1, wherein accumulating the shadow map accounts for ambient light.

12. A computer program product for use on a computer system for creating an image in a tangible medium of a physical scene, the image including a plurality of pixels, the computer program product comprising a non-transitory computer-readable medium on which are stored computer instructions such that, when executed by a processor, the instructions cause the processor to:

a. receive elevation point data in which an elevation value is associated with each of a plurality of spatial coordinates corresponding to elevation points, each elevation point centered within a distinct grid cell;
b. determine a light source position specified in 3D space;
c. transform the elevation point data to a Cartesian coordinate system;
d. generate plumb line walls from elevation points of distinct grid cells to a z=0 plane for each elevation point meeting a specified delta elevation criterion;
e. build a modelview matrix based on the specified light source position;
f. accumulate a shadow map based on visibility of each pixel to the light source position;
g. transform the shadow map to a viewer frame of reference; and
h. in a subsequent pass through pixels within a specified view volume, process each pixel as a visible pixel or an occluded pixel on a basis of the shadow map; and
i. create the image in the tangible medium with each pixel correspondingly visible or shadowed.

13. A computer program product according to claim 12, wherein the computer instructions cause the processor to format the shadow map in a grid of image tiles.

14. A computer program product according to claim 12, wherein the instructions cause the processor to optimize a Z depth spread of a raster coordinate system.

* * * * *